United States Patent [19]
McClelland

[11] Patent Number: 5,963,128
[45] Date of Patent: Oct. 5, 1999

[54] REMOTE TIRE PRESSURE MONITORING SYSTEM

[75] Inventor: Stephen McClelland, Portadown, United Kingdom

[73] Assignee: Schrader-Bridgeport International, Inc., Chicago, Ill.

[21] Appl. No.: 08/583,096

[22] PCT Filed: Nov. 22, 1994

[86] PCT No.: PCT/US94/13271

§ 371 Date: Jan. 17, 1996

§ 102(e) Date: Jan. 17, 1996

[87] PCT Pub. No.: WO96/15919

PCT Pub. Date: May 30, 1996

[51] Int. Cl.⁶ ................................................. B60C 23/00
[52] U.S. Cl. ..................... 340/447; 340/440; 340/686.1; 73/146.5
[58] Field of Search ................................. 340/442, 445, 340/447, 440, 686.1, 146; 73/146.5, 146.3, 146.4

[56] References Cited

U.S. PATENT DOCUMENTS

| | | | |
|---|---|---|---|
| 4,311,985 | 1/1982 | Gee et al. | 340/58 |
| 4,947,151 | 8/1990 | Rosenberger | 340/426 |
| 5,061,917 | 10/1991 | Higgs et al. | 340/447 |
| 5,109,215 | 4/1992 | Williams | 340/447 |
| 5,285,189 | 2/1994 | Nowicki et al. | 340/447 |
| 5,335,540 | 8/1994 | Bowler et al. | 73/146.5 |
| 5,463,374 | 10/1995 | Mendez et al. | 340/442 |
| 5,473,938 | 12/1995 | Handfield et al. | 73/146.5 |
| 5,540,092 | 7/1996 | Handfield | 73/146.5 |
| 5,838,229 | 11/1998 | Robinson, III | 340/447 |

*Primary Examiner*—Daniel J. Wu
*Attorney, Agent, or Firm*—Sughrue, Mion, Zinn, Macpeak & Seas, PLLC

[57] ABSTRACT

A system which monitors a vehicle's tire pressures and displays real-time pressure values on a dashboard display while the vehicle is on the road. An electronic unit with pressure sensor, roll switch, reed switch, tilt switch, battery and control electronic, mounted to the valve stem inside each tire uses the pressure sensor to periodically measure the tire pressure, and uses a transmitter to transmit the measured pressure values, via RF transmission, to a dashboard mounted receiver. The receiver controls a display which indicates to the driver the real-time tire pressure in each wheel. the display also indicates an alarm condition when the tire pressure falls below certain predefined thresholds. The pressure values are compensated for temperature changes inside the tire, and also may be compensated for altitude changes.

18 Claims, 3 Drawing Sheets

TRANSMITTER BLOCK DIAGRAM

TRANSMITTER BLOCK DIAGRAM

TRANSMITTER OPERATION FLOWCHART

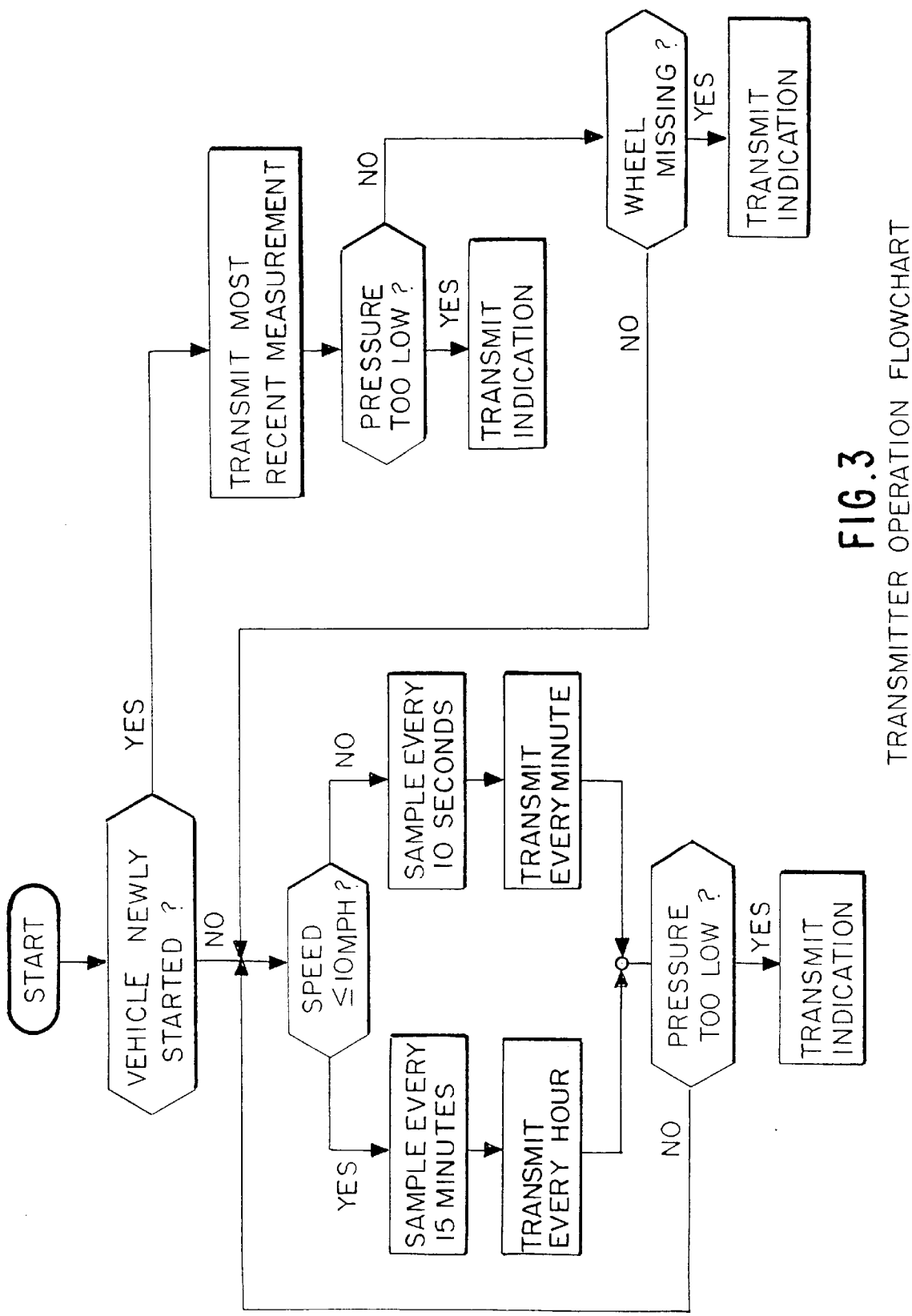
FIG. 3 TRANSMITTER OPERATION FLOWCHART

REMOTE TIRE PRESSURE MONITORING SYSTEM

FIELD OF THE INVENTION

The present invention relates to a remote tire pressure monitoring system for vehicles. The system provides temperature-compensated and, in one embodiment, altitude-compensated tire pressure indications through transmission of radio frequency (RF) signals from tire mounted sensors to a central location on the vehicle. The system also incorporates the assignee's technology, as described in copending application No. PCT/US93/01995, filed Mar. 11, 1993, related, among other things, to a technique which enables the system to learn tire identification and position on a vehicle, without confusion from other vehicles that may be nearby. The disclosure of that copending application is expressly incorporated herein by reference.

BACKGROUND OF THE INVENTION

In the past there have been many attempts to provide tire pressure monitoring in vehicles. Numerous patents have issued which disclose various approaches. Earlier designs tended to be of an electromechanical nature, with large inductive coil mechanisms attached to the wheel and brake drum. These systems provided a high level of information, as to both tire pressure and tire temperature, on a continuous basis. However, high cost and installation difficulties made such systems unacceptable to the majority of mainstream car companies.

More recently, lower cost systems have been developed which provide a simple threshold pressure warning by means of a pressure switch, an internal power source, and a radio wave communication link from each wheel to a dashboard receiver and display. These systems are more attractive to car companies because of their low cost and ease of installation. However, these systems have a number of problems, including, inter alia, the ability to provide a long-lasting and reliable power source, the size and weight of the wheel unit, and mounting of the unit inside the wheel. Moreover, the information available in such systems has been limited to a single pressure threshold, typically 25 psi, which may or may not be compensated for changes in temperature which occur inside the tire. Also, such systems, some of which are not mounted internally of the tire, have been unable to compensate for changes in altitude, which can affect the performance of tire pressure monitoring systems.

SUMMARY OF THE INVENTION

In view of the foregoing, it is one object of the present invention to provide a system which gives continuous tire pressure information on a real time basis, as in the earlier coil type systems, but which utilizes the low-cost radio wave communication system of the more recent threshold based systems. As a result, the inventive system provides a high level of information, while maintaining low cost and relative simplicity, and thus will be more attractive to car manufacturers.

In one embodiment of the inventive system, each wheel unit is constituted by of a low profile enclosure mounted on the back of a conventional clamp-in tire valve on the inside of the wheel and tire. The enclosure houses an electronic unit comprising a battery, a pressure sensor, a roll (motion) switch, control electronics, and a radio transmitter. The entire assembly preferably is fully potted to protect the electronics from the environment. The overall size and weight are kept to a minimum; the entire enclosure is located inside the wheel drop center well, thus preventing tire fitting and tire removal problems.

The wheel units measure tire pressure and report the information to a dashboard receiver via radio wave communication. To conserve battery power, the pressure is sampled periodically, typically once every 10 seconds, while the vehicle is in motion. In addition, the RF signals are transmitted periodically, typically once every minute, again while the vehicle is in motion, provided the tire pressure is not changing rapidly. Rapid tire pressure changes (e.g. greater than 1 psi in 10 seconds) are detected in the course of the pressure measurements, and are reported immediately to the dashboard receiver via an RF transmission. This immediate transmission ensures that the driver will be warned of a hazardous pressure level as soon as one occurs.

As alluded to earlier, each wheel unit also preferably is provided with a roll or motion detection switch which detects vehicle movement, to enable further battery conservation. While the vehicle is in motion, typically, at a speed greater than 10 mph, the device obtains tire pressure samples and transmits them as just described. However, when the vehicle is stationary, particularly, for example, when the vehicle is housed overnight in a garage, the periodicity of pressure sampling and RF transmissions changes considerably. Typically, the pressure samples are taken once every 15 minutes, rather than every 10 seconds, while the vehicle is stationary for long periods of time. The RF reports are transmitted only once per hour instead of once per minute.

The inventive approach, which takes advantage of the lessened danger from tire pressure reductions while a vehicle is not moving, reduces power consumption significantly; however, since the receiver is always active, an instant read-out of tire pressure is available as soon as the car ignition is switched on. As a result, if a leak occurs overnight while the car is stationary, as soon as the driver turns the key in the morning, a warning light or alarm can be activated to warn the driver of the low tire pressure condition before the vehicle starts to move.

Each wheel unit has a unique identity code which is programmed into the receiver at installation. Up to two million identity codes are available, so as to prevent crosstalk between vehicles, and consequent false reception of information. Every RF transmission contains pressure information and the identity code of the particular wheel, to allow the receiver to know which of the four wheels has reported, and also to reject all reports from other vehicles with a similar system fitted in close proximity. The provision of a unique identity code completely avoids false pressure reports from adjacent vehicles.

The dashboard receiver receives the RF transmissions and decodes the digital information, which is constituted by the wheel identity code and the corresponding tire pressure information. The receiver connects to the car's on board computer and/or a dashboard mounted display. The display can be in the form of an LCD, bulbs, buzzer or even a voice synthesizer to warn the driver of abnormal pressures. Any number of thresholds with different alarm levels can be selected at the time of manufacture; alternatively, it is possible to provide a driver programmable threshold.

The receiver in the car's dashboard consists of an RF receiver section, a microcontroller section, an output interface section, and a barometric pressure measurement section. An example of such a receiver section is discussed in the above-mentioned PCT application. Since the wheel units are housed entirely inside the tire and wheel assembly, the pressure measurements made by the wheel unit are independent of outside ambient pressure. Weather changes and, more significantly, changes in altitude cause a wide variation in ambient atmospheric pressure. In particular, driving at high altitudes can alter the ambient pressure by several psi; for example, at 12,000 feet, there is approximately a 6 psi change in ambient pressure.

To correct the wheel unit pressure measurements for outside ambient pressure changes, a pressure sensor mounted in the receiver continually monitors ambient pressure. This information is used to provide a true 'gauge' pressure of the tire pressure to be displayed. This approach is very beneficial when all four tire pressures are displayed on the vehicle's dashboard, as the driver can read the tire pressure on the dashboard and can correlate those readings with those measured on a simple tire pressure gauge applied to the tire's valve.

In accordance with the invention, there is another option available, which may be desired by vehicle manufacturers who do not intend to supply a full pressure read-out display, but rather intend to supply something along the lines of a threshold warning light system. If this is the case, it is possible to provide a wheel unit that provides a temperature-compensated pressure indication. When a car is in motion for a period of time, tire temperature can increase significantly, depending on the speed of the vehicle, road conditions, amount of braking, etc. As the tire and wheel assembly constitute a sealed pressure chamber, the tire pressure rises and falls in direct proportion to the tire temperature.

In some cases, as mentioned above, it is preferable if the pressure measurement were transparent to pressure changes caused by temperature and only reacted to pressure changes caused by a loss (or gain) of air in the tire. Accordingly, the inventive system has been designed to provide such a temperature compensated pressure value. When selected, the pressure reported from each wheel is referenced to a standard temperature. For example, assume the tire pressure is 30 psi at 20° C. ambient temperature, and that as the car is driven, the internal tire temperature rises to 40° C. because of friction of the tire with the road. This 20° C. rise in temperature causes a proportional increase of tire pressure, in absolute terms, and therefore the pressure will change to approximately 33 psi. Normally the system would report the pressure change, and the 33 psi would be shown on the display. However, in a temperature compensated system, the pressure displayed would remain at 30 psi even though the real pressure had increased. In this way, only inflation or deflation would result in a pressure change.

BRIEF DESCRIPTION OF THE DRAWINGS

The foregoing and other objects and features of the present invention now will be described in detail with the accompanying drawings, in which:

FIG. 3 is a further flow chart depicting another illustrative sequence of control operation in accordance with the presently preferred embodiment.

DETAILED DESCRIPTION OF THE PREFERRED EMBODIMENTS

Figure 1:
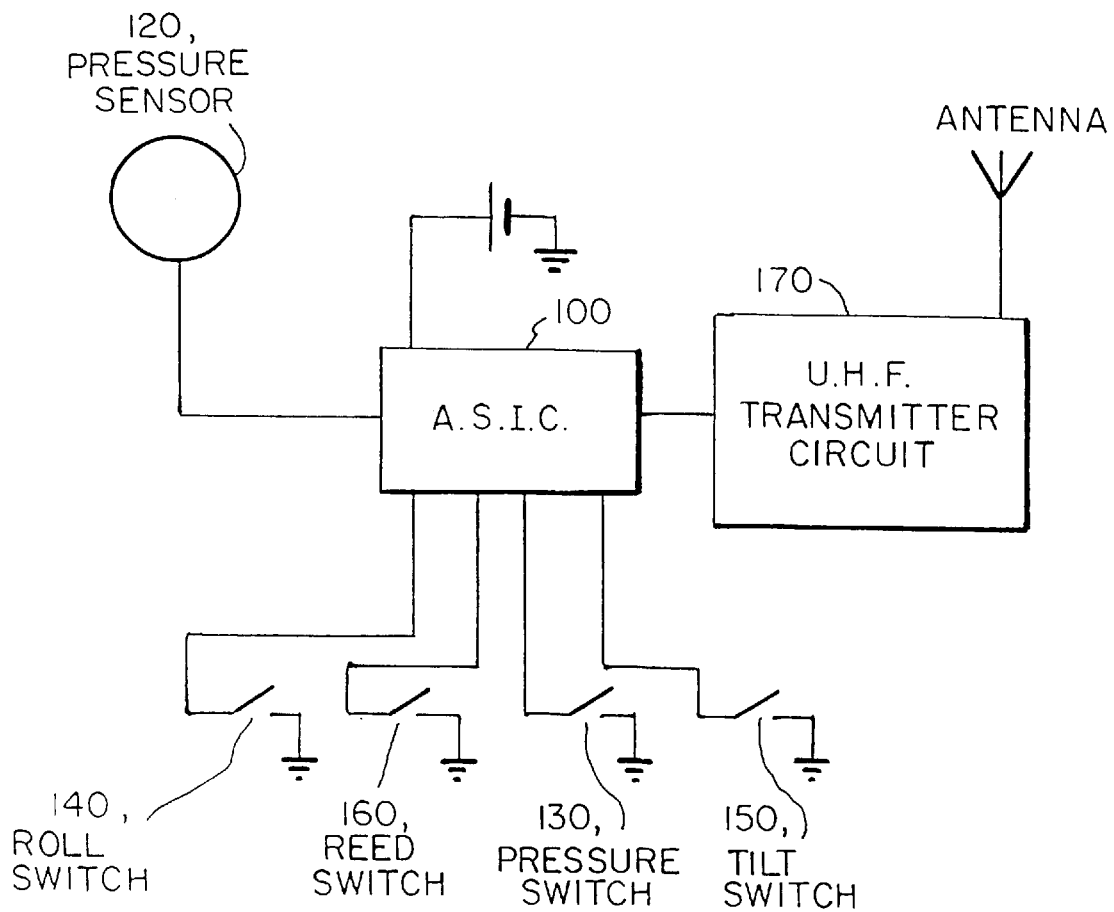
FIG. 1 is a block diagram of the circuitry involved in controlling the inventive tire pressure monitoring system in accordance with a presently preferred embodiment of the present invention.

In FIG. 1, which is an electronic block diagram of the wheel unit, an Application Specific Integrated Circuit (ASIC) 100 is shown as being at the heart of the device. The ASIC is shown as having six peripheral devices connected directly to it as well as a single cell lithium battery source 110. The six peripheral devices shown include a pressure sensor 120, four types of switches 130–160 (an optional pressure switch 130, a roll switch 140, a tilt switch 150, and a reed (magnetic) switch 160,) and a UHF oscillator transmitter circuit 170.

The overall circuit operates as follows. The ASIC 100 monitors the status of the roll switch 140 continually. The roll switch 140 indicates vehicle speed. When the vehicle is stationary or at speeds below 10 mph, the roll switch 140 is open. However, when the vehicle's speed is greater than 10 mph, the roll switch 140 closes. The ASIC 100, which is a mixed (analog and digital) CMOS custom integrated circuit, detects the closure of the roll switch 140.

On closure of the roll switch 140, the ASIC 100 begins to sample the tire pressure periodically, typically every 10 seconds, as detected by pressure sensor 120. In one embodiment, the pressure sensor 120 is a micro-machined piezo-resistive silicon sensor; in another embodiment, the pressure sensor 120 is a capacitive pressure sensor, fabricated using similar micro-machining technology. During the measurement cycle, the ASIC 100 powers up the pressure sensor 120, and monitors the outputs of the sensor 120 which are fed into the ASIC 100. The output of the sensor 120 is either a voltage proportional to pressure (in the case of the piezo-resistive pressure sensor embodiment), or a capacitance proportional to pressure (in the case of the capacitive pressure sensor embodiment). The sensor output is measured, and the pressure calculated using calibration constants stored in the ASIC's own internal non-volatile (EEPROM) memory. These constants are loaded into the ASIC 100 automatically during an initial calibration procedure carried out during the manufacturing process. Such processes are known to those of working skill in this field, and so need not be detailed here further. Temperature correction and compensation techniques are also employed at this stage, internal to the ASIC 100, to provide an accurate measurement of tire pressure across the temperature range of interest.

The pressure measurement or pressure sampling process takes approximately 100 ms; at the end of the process the ASIC 100 powers down into a special low power or "sleep" mode. During this time, the ASIC 100 simply runs a clock counter and also monitors its four switch inputs. If the roll switch 140 remains closed, then after 10 seconds the ASIC 100 "wakes" up from sleep mode and repeats the pressure measurement process. Periodically, typically once per minute while driving, the ASIC 100 activates the UHF transmitter 170 in order to transmit the pressure information by means of radio communication a dashboard receiver aboard the vehicle.

The ASIC 100 provides power to a UHF oscillator, which has a fundamental frequency in the region of 300–450 MHz. In addition, the ASIC 100 provides digital information to the UHF circuit 170 which modulates the fundamental oscillator. The UHF circuit 170 is an oscillator and amplifier configuration which is frequency controlled by a Surface Acoustic Wave (SAW) resonator. This approach to frequency control maintains frequency stability and control over a wide operating temperature range. An example of a SAW resonator is discussed in the above-referenced PCT application.

The UHF circuit 170 has an integral antenna which also connects to the tire valve onto which the whole electronics housing is mounted. The tire valve provides an antenna which extends outside the tire and aids the RF communication performance significantly. The radio signals can be either amplitude modulated (AM) or frequency modulated (FM), depending on customer choice and other application reasons. Either way, the digital information to be transmitted is encoded onto the fundamental frequency by the ASIC 100 and is decoded subsequently by the receiver circuitry on board the vehicle.

The digital information transmitted by the wheel unit consists of wheel unit identity codes, which can be up to 21 bits long (thus allowing two million individual codes,) eight bits of pressure data, and various function bits which allow special messages such as "Low Battery" to be transmitted. In addition, error checking bits are included to aid the decoding process, and prevent erroneous data being logged or displayed.

One complete transmission takes place over one second. Each individual transmission, comprising a "word" of information, occurs over a much shorter period, typically 20 ms. However, to ensure high performance, and in particular to ensure that the on board receiver receives the transmission, the words are repeated several times, spaced randomly throughout the one second. The random nature of the word spacing allows transmissions from more than one transmitter to be received at the same time, even if the beginnings of all of the transmissions are totally synchronized. To prevent all of the transmitters from having their transmissions synchronized, resulting in all wheels reporting at exactly the same time, as well as the words transmitted being spaced apart differently, the actual period of transmissions also varies from unit to unit. For example, when the vehicle is in operation, one of the transmitters may transmit every 60 seconds, while another may transmit every 63 seconds etc. This spacing of transmissions means that, even in the unlikely event that two or more transmitters clash during a given transmission, one minute later, during the next transmission those transmitters will not clash. Again, this type of randomization is discussed in the above-referenced PCT application.

The one-minute continual updating of transmissions is provided purely for supervisory purposes. The receiver expects each wheel to transmit every minute while the vehicle is in motion (i.e. moving over 10 mph). The identity codes and pressure data contained in each transmission are used by the receiver to identify, first, that the transmission is from a wheel belonging to the vehicle; second, from which wheel position (e.g., front left) the transmission is coming; and, third, the actual tire pressure.

Figure 2:
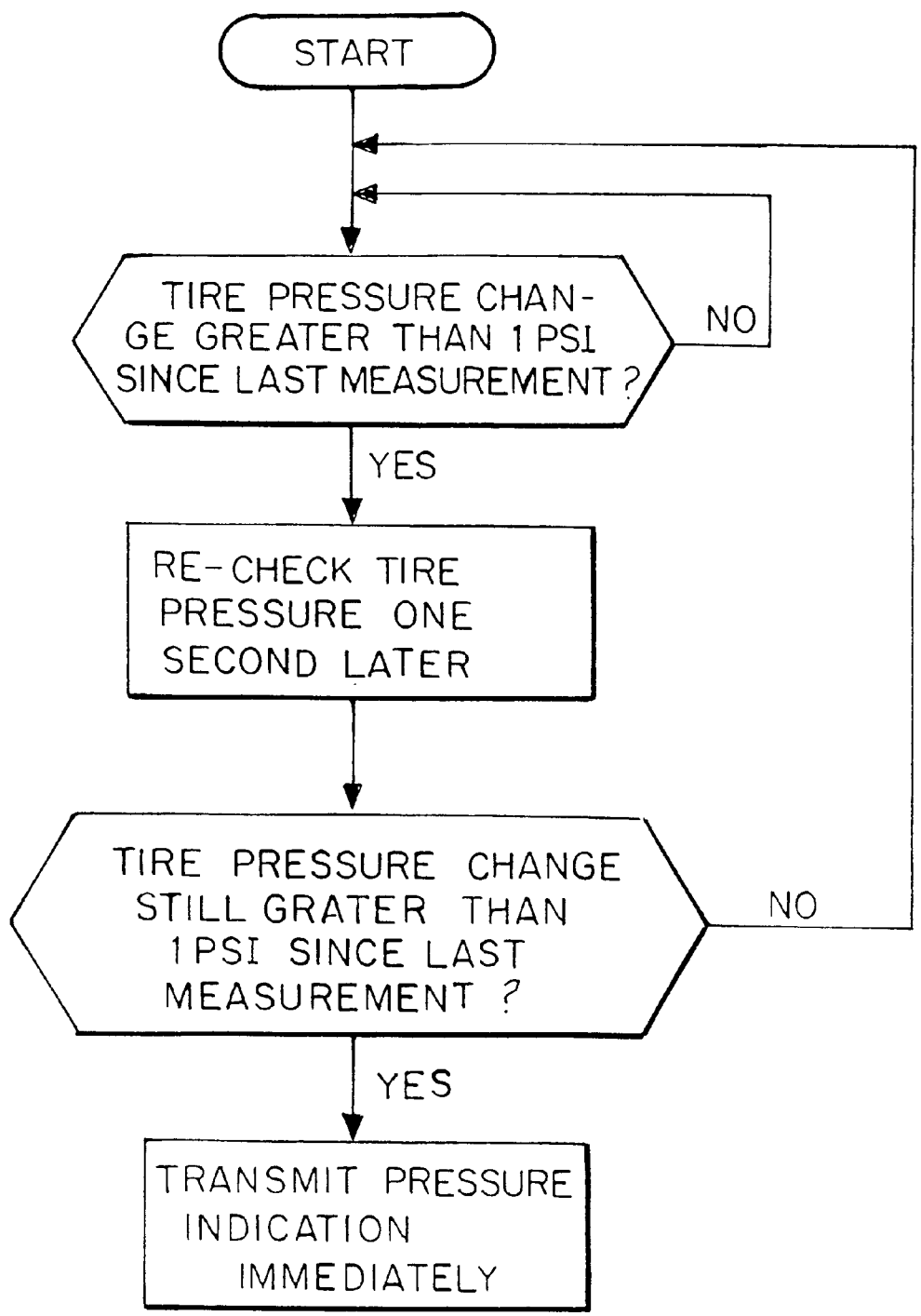
FIG. 2 is a flow chart depicting an illustrative sequence of control operation in accordance with the presently preferred embodiment.

For rapidly changing pressure, as would occur if there were a leak, the ASIC 100 initiates a transmission as soon as it detects a significant change in pressure, as depicted in FIG. 2. For example, assuming the pressure samples taken ever 10 seconds show a constant pressure of 33 psi in a given wheel, then every one minute the corresponding wheel unit would transmit a pressure 33 psi, with the respective identity code, to the dashboard. Ten seconds later, at the next pressure sample, if the pressure has changed by more than one psi (in this example, if the pressure has fallen to 32 psi or lower,) the ASIC 100 would detect this change. First, the ASIC 100 re-samples the pressure sensor one second later to verify the pressure change, and then immediately transmits the new information. In this way, supervisory reports once per minute are augmented by immediate transmissions as soon as a significant pressure change is detected. This immediate updating warns the driver of any abnormal changes in pressure as soon as such changes occur.

While the vehicle is in motion, the above sequence of events repeats continually. When the vehicle comes to a halt, or if vehicle speed drops below 10 mph, the roll switch 140 opens. Upon detection of the opening of the roll switch 140, the ASIC 100 starts a counter/timer. After the passage of a predetermined period (in one embodiment, 5 minutes) to allow for normal driving events such as stop signs, traffic lights, and traffic jams which normally would not result in extended vehicle stoppage, the ASIC 100 will interpret the longer stoppage as indicating that the vehicle now is stationary.

In stationary mode, the ASIC 100 can be programmed to carry out two different roles. In one embodiment, the ASIC 100 will stop monitoring tire pressure completely, and will not make any transmissions. In this state, the ASIC 100 is in a total power-down mode, consuming only very minimal power. Also, in this mode, the receiver also can be completely turned off when the car's ignition is switched off. In another embodiment, during stationary periods the wheel unit will stay active, continuing to sample the output of the pressure sensor 120 and making RF transmissions as before. However, now the sample period is lengthened significantly, typically to 15 minutes as opposed to 10 seconds. Also, the period for supervisory RF transmission is increased from 1 minute to typically once per hour. Now, by keeping the receiver in the vehicle active while the ignition is off, for example overnight, the wheel units still monitor and report tire pressure. Therefore, when the driver turns the key in the ignition the next morning, the tire pressures in all four wheels can be displayed and alarms annunciated, where necessary, before the driver leaves his garage or driveway. The number of pressure samples and RF reports have been drastically reduced to conserve battery power while the vehicle is stationary, but the driver is still provided with an 'Instant On' tire pressure report. The foregoing is summarized in FIG. 3.

The functions of the other three switches shown in FIG. 1 now will be discussed. A magnetically activated reed switch 160, included in the wheel unit, is connected to the ASIC 100. The reed switch 160 is activated by a small hand held magnet, applied close to the valve stem on the edge of the wheel rim outside the tire. Whenever a magnet is held in that position the reed switch closes. The ASIC 100 senses this closure; after a verification period of 2 seconds, the ASIC 100 transmits continually a special 'Learn' sequence, as described in the above-mentioned copending PCT application. If the magnet is brought away from the wheel, the reed switch 160 opens, and the transmissions cease immediately. This activity is used when the system is installed on the vehicle, and also is useful when the tires are changed or rotated as described in the above-referenced PCT application.

With all wheels fitted with transmitters, each having a different unknown identity code, the following method for the system receiver to 'learn' the wheel identity codes unique to that vehicle has been developed. The receiver may be put into a special 'learn mode' by a simple switch on the exterior of the receiver, or by programming the receiver through a digital communication part on the receiver, which may be linked to a computer on board the vehicle. In 'learn mode,' the receiver expects to receive four different transmissions, one in turn from each wheel (for a four-wheel car; the sequence will be different, or even extended, for vehicles with a greater number of wheels). The person installing the system walks around the vehicle in a prescribed sequence, with a magnet in hand (perhaps attached to a rod, to save the person from having to bend near the wheel,) and activates a learn transmission from each wheel using the hand held magnet in the prescribed manner. (This procedure can also be carried out automatically with robotically-controlled magnets on a car production line.) The receiver receives the different transmissions, and loads the identity codes it has received into non-volatile (EEPROM) memory.

In normal operation of the system, for every transmission received, the received identity code is compared to those in memory. If the code correlates, then the receiver processes the pressure data, and updates the display or outputs an alarm if necessary. However, if the identity code received does not match any of those stored in memory, the complete transmission is assumed to be from another vehicle with a similar system or noise from other sources and is rejected.

The other two switches shown in FIG. 1 are optional, and depend on particular customer requirements. The pressure switch 130 is a mechanical diaphragm type pressure switch either internally pressurized or vacuum filled, which switches at a given threshold pressure. The ASIC 100 is factory programmable, so as to provide for three possible options regarding the use of a pressure switch such as the switch 130. In accordance with a first option, in which only a pressure switch is used to monitor tire pressure, the sampling of the pressure sensor and subsequent pressure calculation is replaced by the simple detection of the pressure switch. At tire pressures above the switch threshold point, the pressure switch is closed, and the wheel unit transmits a 'normal' or 'good' pressure signal as part of its transmission sequence. If the pressure falls below the switch threshold, the pressure switch opens. This is detected immediately by the ASIC 100, and an 'abnormal' or 'low' pressure signal is transmitted. The receiver in this case sounds an alarm or turns on a warning light.

In accordance with the second option, both a pressure switch and pressure sensor are used together. At high and normal pressures when the pressure switch is closed, the pressure sensor is not sampled every 10 seconds, only occasionally to double check the switch status, for example, every 1 hour. When the pressure switch 130 opens because of falling pressure, the pressure sensor sample measurements commence and an accurate value of the low pressure condition can be transmitted, allowing close monitoring of abnormal tire pressures. In this way, power consumption is reduced dramatically, as typically over 95% of the time the pressure in the tire will be normal, and the closed pressure switch 130 prevents unnecessary pressure samples being made during this period.

In accordance with a third option for using the pressure switch, pressure is monitored while the vehicle is stationary, the pressure sensor 120 then being used for pressure monitoring while the vehicle is moving. That is, as soon as the roll switch 140 opens, indicating that the vehicle is stationary, all pressure sensor samples cease and the ASIC 100 simply acts on a change in status of the pressure switch, thereby significantly saving battery power as no pressure samples are made throughout the life of the car while the car is stationary.

The tilt switch 150 shown in FIG. 1 is used to indicate that the wheel is tilted at a certain angle, typically 30° from the normal vertical position. In this manner, the switch 150 can detect wheel removal from the vehicle, as for example in the case of wheel theft. If the vehicle's car alarm is armed a special security transmission initiated by the wheel unit when the tilt switch 150 closes can be made to sound the car alarm. This feature can provide a deterrent to wheel thieves.

The receiver in the low tire pressure warning system is of conventional design. A superheterodyne or superregenerative RF front-end can be selected, depending on modulation type and data rate required for a particular application. The decoding section, which is microcontroller based, includes a non-volatile memory for storing the four wheel addresses loaded during the 'learn mode' sequence at installation. Analog circuitry including a pressure sensor is used to provide a measurement of ambient atmospheric pressure which corrects the incoming wheel pressures for gauge readings. Output driver blocks are included to provide adequate buffering and drive capability for the type of interconnection and display/warning selected.

The receiver software embedded in the microcontroller has the ability to carry out the 'learn mode' sequence, can rotate tire locations using external programming, allows adjustment of threshold levels and also provides diagnostic information of each component of the system, i.e. all four transmitters and the RF section of the receiver. Some of these details are described in the above-mentioned PCT application; others will be apparent to those of working skill in this field, and so need not be described in detail here.

The receiver also is capable of being adapted to receive other transmitters on a similar fundamental frequency to provide much greater control capabilities. For example, 'remote keyless entry' systems currently being developed for vehicles could be designed to use the receiver component of the low tire pressure warning system, saving considerable cost by combining both low tire pressure warning and keyless entry into one common receiver unit.

While the invention has been described with reference to a preferred embodiment, various modifications will be apparent to those of working skill in this technical field. Accordingly, the invention is to be construed as limited only with reference to the appended claims.

What is claimed is:

1. In a vehicle having at least two wheels with tires mounted thereon, a remote tire pressure monitoring system comprising, for each of said tires:

a pressure sensor for sensing a pressure of said tire, and providing tire pressure measurements accordingly;

a radio transmitter for transmitting said tire pressure measurements via radio transmissions;

a control circuit, connected to said pressure sensor and said radio transmitter, for controlling operation of said pressure sensor and said radio transmitter, including control of a periodicity of operation of said pressure sensor and said radio transmitter;

a roll switch, connected to said control circuit and having at least first and second states, for monitoring a state of motion of said vehicle; and a power supply for providing power continuously to said control circuit;

wherein, in response to said first state of said roll switch, said control circuit causes said pressure sensor and said radio transmitter to operate at a first periodicity, and in response to said second state of said roll switch, said control circuit causes said pressure sensor and said radio transmitter to operate a second periodicity that is more frequent than said first periodicity.

2. A remote tire pressure monitoring system as claimed in claim 1, wherein said first periodicity is 15 minutes for said pressure sensor and one hour for said radio transmitter, and said second periodicity is 10 seconds for said pressure sensor and one minute for said radio transmitter.

3. A remote tire pressure monitoring system as claimed in claim 1, further comprising a tilt switch, connected to said control circuit and having at least first and second states, for monitoring an angle at which said tire is mounted, wherein, in response to one of said first and second states of said tilt switch, said control circuit causes said radio transmitter to output an alarm indicative of an unsatisfactory mounting state of said tire.

4. A remote tire pressure monitoring system as claimed in claim 1, wherein, in response to said tire pressure measurements, said control circuit causes said radio transmitter to output digital signals comprising a predetermined number of bits.

5. A remote tire pressure monitoring system as claimed in claim 4, wherein said predetermined number of bits includes a first number of bits providing a unique identification of said tire.

6. A remote tire pressure monitoring system as claimed in claim 1, further comprising a magnetically-activated switch, connected to said control circuit and responsive to presence of a magnetic field, for placing said magnetically-activated switch in a first state, said control circuit being responsive to said first state of said magnetically-activated switch to cause said radio transmitter to transmit an identification signal uniquely identifying said tire.

7. A remote tire pressure monitoring system as claimed in claim 1, wherein said pressure sensor compensates for changes in altitude encountered under different driving conditions.

8. A remote tire pressure monitoring system as claimed in claim 1, wherein said pressure sensor comprises a piezo-resistive sensor.

9. A remote tire pressure monitoring system as claimed in claim 1, wherein said pressure sensor comprises a capacitive sensor.

10. In a vehicle having at least two wheels with tires mounted thereon, a remote tire pressure monitoring system comprising, for each of said tires:
   a pressure sensor for sensing a pressure of said tire, and providing tire pressure measurements accordingly;
   a radio transmitter for transmitting said tire pressure measurements via radio transmissions;
   a control circuit, connected to said pressure sensor and said radio transmitter, for controlling operation of said pressure sensor and said radio transmitter, including control of a periodicity of operation of said pressure sensor and said radio transmitter;
   a tilt switch, connected to said control circuit and having at least first and second states, for monitoring a mounting state of said tire; and
   a power supply for providing power continuously to said control circuit;
   wherein, in response to one of said first and second states of said tilt switch, said control circuit causes said radio transmitter to output an alarm indicative of an unsatisfactory mounting state of said tire.

11. A remote tire pressure monitoring system as claimed in claim 10, further comprising a roll switch, connected to said control circuit and having at least first and second states, for monitoring a state of motion of said vehicle, wherein, in response to said first state of said roll switch, said control circuit causes said pressure sensor and said radio transmitter to operate at a first periodicity, and in response to said second state of said roll switch, said control circuit causes said pressure sensor and said radio transmitter to operate a second periodicity that is more frequent than said first periodicity.

12. A remote tire pressure monitoring system as claimed in claim 11, wherein said first periodicity is 15 minutes for said pressure sensor and one hour for said radio transmitter, and said second periodicity is 10 seconds for said pressure sensor and one minute for said radio transmitter.

13. A remote tire pressure monitoring system as claimed in claim 10, wherein, in response to said tire pressure measurements, said control circuit causes said radio transmitter to output digital signals comprising a predetermined number of bits.

14. A remote tire pressure monitoring system as claimed in claim 13, wherein said predetermined number of bits includes a first number of bits providing a unique identification of said tire.

15. In a vehicle having at least two wheels with tires mounted thereon, a remote tire pressure monitoring system comprising, for each of said tires:
   a pressure sensor for sensing a pressure of said tire, and providing tire pressure measurements accordingly;
   a radio transmitter for transmitting said tire pressure measurements via radio transmissions;
   a control circuit, connected to said pressure sensor and said radio transmitter, for controlling operation of said pressure sensor and said radio transmitter, including control of a periodicity of operation of said pressure sensor and said radio transmitter;
   a magnetically-activated switch, connected to said control circuit and responsive to presence of a magnetic field, for placing said magnetically-activated switch in a first state, wherein, in response to said first state of said magnetically-activated switch, said control circuit causes said radio transmitter to transmit an identification signal uniquely identifying said tire;
   a power supply for providing power continuously to said control circuit;
   a roll switch, connected to said control circuit and having at least first and second states, for monitoring a state of motion of said vehicle, wherein, in response to said first state of said roll switch, said control circuit causes said pressure sensor and said radio transmitter to operate at a first periodicity, and in response to said second state of said roll switch, said control circuit causes said pressure sensor and said radio transmitter to operate a second periodicity that is more frequent than said first periodicity; and
   a tilt switch, connected to said control circuit and having at least first and second states, for monitoring an angle at which said tire is mounted, wherein, in response to one of said first and second states of said tilt switch, said control circuit causes said radio transmitter to output an alarm indicative of an unsatisfactory mounting state of said tire.

16. A remote tire pressure monitoring system as claimed in claim 15, wherein said first periodicity is 15 minutes for said pressure sensor and one hour for said radio transmitter, and said second periodicity is 10 seconds for said pressure sensor and one minute for said radio transmitter.

17. A remote tire pressure monitoring system as claimed in claim 15, wherein, in response to said tire pressure measurements, said control circuit causes said radio transmitter to output digital signals comprising a predetermined number of bits.

18. A remote tire pressure monitoring system as claimed in claim 17, wherein said predetermined number of bits includes a first number of bits providing a unique identification of said tire.

* * * * *